US 6,608,121 B2

(12) United States Patent
Isozaki et al.

(10) Patent No.: US 6,608,121 B2
(45) Date of Patent: Aug. 19, 2003

(54) WATER-SOLUBLE RESIN COMPOSITION AND WATER-SOLUBLE FILM

(75) Inventors: Takanori Isozaki, Kurashiki (JP); Naoki Fujiwara, Kurashiki (JP); Kazuyuki Somemiya, Kurashiki (JP); Shintaro Hikasa, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 186 days.

(21) Appl. No.: 09/908,624

(22) Filed: Jul. 20, 2001

(65) Prior Publication Data
US 2002/0037946 A1 Mar. 28, 2002

(30) Foreign Application Priority Data
Aug. 7, 2000 (JP) .......................... 2000-238363
Aug. 7, 2000 (JP) .......................... 2000-238366

(51) Int. Cl.[7] .............. C08L 3/02; C08L 5/00; C08L 29/04; C08K 5/053
(52) U.S. Cl. ............... 524/47; 524/55; 524/56; 524/58; 524/385; 524/386; 524/387; 524/492; 524/557
(58) Field of Search .............. 428/35.2; 524/47, 524/55, 56, 58, 385, 386, 387, 492, 557

(56) References Cited

U.S. PATENT DOCUMENTS 5,487,947 A * 1/1996 Kakishita et al. ......... 428/424.4
6,166,117 A 12/2000 Miyazaki ................... 524/291
6,337,369 B1 1/2002 Isozaki ....................... 525/61

FOREIGN PATENT DOCUMENTS

| EP | 0 611 804 | 8/1992 |
| EP | 1008605 | 6/2000 |
| JP | 07228624 | 8/1995 |
| WO | 96/01874 | 1/1996 |
| WO | 99/46329 | 9/1999 |

* cited by examiner

Primary Examiner—Peter Szekely
(74) Attorney, Agent, or Firm—Oblon, Spivak, McClelland, Maier & Neustadt, P.C.

(57) ABSTRACT

A water-soluble resin composition is provided which comprises (i) 100 parts by weight of a polyvinyl alcohol polymer having a 1,2-glycol linkage content of at least 1.8 mole percent and a degree of hydrolysis of at least 90 mole percent, (ii) 1 to 50 parts by weight of a plasticizer and (iii) 5 to 50 parts by weight of a monosaccharide and/or a polysaccharide, optionally together with (iv) 1 to 20 parts by weight of an inorganic filler. Also provided is a water-soluble resin composition which comprise (i') 100 parts by weight of a polyvinyl alcohol polymer having a 1,2-glycol linkage content of at least 1.8 mole percent and a degree of hydrolysis of 92 to 99 mole percent, (ii') 1 to 50 parts by weight of a plasticizer and (iv') 1 to 20 parts by weight of an inorganic filler, optionally together with (iii') 5 to 50 parts by weight of a monosaccharide and/or polysaccharide. Further provided are water-soluble films produced by using those water-soluble resin compositions.

19 Claims, No Drawings

WATER-SOLUBLE RESIN COMPOSITION AND WATER-SOLUBLE FILM

BACKGROUND OF THE INVENTION

1. Field of the Invention

The present invention relates to a water-soluble resin composition comprising a polyvinyl alcohol polymer (hereinafter, polyvinyl alcohol polymer is abbreviated as "PVA", in some cases) and a specific ingredient incorporated therein and to a water-soluble film produced by using the water-soluble resin composition.

2. Description of the Prior Art

In recent years, a technique of packaging unit doses of various chemicals or agents, typically agrochemicals, in sealed water-soluble film containers has acquired more and more popularity. When the unit dose packages as such are thrown into water, the packaging film is dissolved in water and the contents are dissolved or dispersed in water to produce the intended effects. The advantageous features of such unit dose packages consist in that even a hazardous agent can be applied or used without directly touching the same, that no metering is necessary prior to application of an agent since a predetermined amount of the agent has already been packaged and that the disposal of the containers, bags or the like used for packaging and transporting an agent is unnecessary or simple and easy.

In the art, unmodified partially hydrolyzed PVA films with a degree of hydrolysis of about 88 mole percent have been used as water-soluble films for such unit dose packaging. These water-soluble films are readily soluble in cold or warm water and, from the viewpoint of the performance characteristics, they are excellent in mechanical strength, among others. However, in view of the recent growing concern about environmental pollution, of the fact that partially hydrolyzed PVA films, when placed under high humidity conditions, absorb moisture from the air and lose their stiffness and stick to rolls and thus show worsened processability and of the current trend toward the use of such films in packaging alkaline detergents and other household articles, films which satisfy a number of performance characteristics requirements, such solubility in water and high biodegradability, stiffness, slight odor emission and alkali resistance, are demanded. As far as such requirements are concerned, unmodified partially hydrolyzed PVA species are sufficiently soluble in water and biodegradable. However, films thereof are disadvantageous in that they lack stiffness and emit the odor of acetic acid and that when they are used for packaging alkaline substances, their water solubility lowers. The reason why unmodified partially hydrolyzed PVA films lack stiffness is presumably that the degree of hydrolysis of the unmodified partially hydrolyzed PVA is low and the water content of films thereof increases accordingly.

A method of improving the water solubility of partially hydrolyzed PVA films is disclosed in Japanese Examined Patent Application (Kokoku)06-27205(Japanese Unexamined Patent Application (Kokai)63-168437) which comprises producing water-soluble films by using a modified PVA as obtained by introduction of the sulfonic group by copolymerization, for instance. This method can improve the water solubility by introducing a modifying group and, therefore, can improve the stiffness by increasing the degree of hydrolysis while improving the water solubility as well. However, it is generally known that copolymerization of PVA with a comonomer results in a decrease in biodegradability and this tendency becomes remarkable with an ionic group-containing comonomer, in particular. Thus, water-soluble films made of such modified PVA may possibly fail to show satisfactory biodegradability.

Under such circumstances, it is an object of the present invention to provide a water-soluble resin composition useful in producing water-soluble films simultaneously satisfying those requirements with respect to such physical properties as water solubility, biodegradability, processability, odor emission and alkali resistance which have not been simultaneously fulfilled by water-soluble films made of the conventional PVA, as well as a water-soluble film made of such water-soluble resin composition.

SUMMARY OF THE INVENTION

The present inventors made intensive investigations and, as a result, found that a water-soluble resin composition comprising PVA having a specific 1,2-glycol linkage content and a specific degree of hydrolysis, with a specific proportion of a plasticizers and a specific proportion of a monosaccharide and/or a polysaccharide incorporated therein, a water-soluble resin composition further comprising a specific proportion of an inorganic filler incorporated therein in addition to the constituents mentioned above, or a water-soluble resin composition comprising a PVA having a specific 1,2-glycol linkage content and a specific proportion of a plasticizer and a specific proportion of an inorganic filler are very useful as a raw material for producing the desired water-soluble films. This finding has led to completion of the present invention.

Thus, the present invention provides a water-soluble resin composition which comprises (i) 100 parts by weight of a polyvinyl alcohol polymer having a 1,2-glycol linkage content of at least 1.8 mole percent and a degree of hydrolysis of at least 90 mole percent, (ii) 1 to 50 parts by weight of a plasticizer and (iii) 5 to 50 parts by weight of a monosaccharide and/or a polysaccharide (hereinafter, such water-soluble resin composition is abbreviated as "composition A1", in some cases) as well as a water-soluble film made by using the above water-soluble resin composition (hereinafter, such film is abbreviated as "film A1", in some cases).

The present invention also provides a water-soluble resin composition which comprises (i) 100 parts by weight of a polyvinyl alcohol polymer having a 1,2-glycol linkage content of at least 1.8 mole percent and a degree of hydrolysis of at least 90 mole percent, (ii) 1 to 50 parts by weight of a plasticizer, (iii) 5 to 50 parts by weight of a monosaccharide and/or a polysaccharide and (iv) 1 to 20 parts by weight of an inorganic filler (hereinafter, such water-soluble resin composition is abbreviated as "composition A2", in some cases and the composition A1 and composition A2 are collectively abbreviated as "composition A", in some cases) as well as a water-soluble film made by using the above water-soluble resin composition (hereinafter, such film is abbreviated as "film A2", in some cases and the film A1 and film A2 are collectively abbreviated as "film A", in some cases).

The present invention further provides a water-soluble resin composition which comprises (i') 100 parts by weight of a polyvinyl alcohol polymer having a 1,2-glycol linkage content of at least 1.8 mole percent and a degree of hydrolysis of 92 to 99 mole percent, (ii') 1 to 50 parts by weight of a plasticizer and (iv') 1 to 20 parts by weight of an inorganic filler (hereinafter, such water-soluble resin composition is abbreviated as "composition B1", in some cases) as well as a water-soluble film made by using the above water-soluble resin composition (hereinafter, such film is abbreviated as "film B1", in some cases).

Still further, the invention provides a water-soluble resin composition which comprises (i') 100 parts by weight of a polyvinyl alcohol polymer having a 1,2-glycol linkage content of at least 1.8 mole percent and a degree of hydrolysis of 92 to 99 mole percent, (ii') 1 to 50 parts by weight of a plasticizer, (iv') 1 to 20 parts by weight of an inorganic filler and 5 to 50 parts by weight of a monosaccharide and/or a polysaccharide (hereinafter, such water-soluble resin composition is abbreviated as "composition B2", in some cases and the composition B1 and composition B2 are collectively abbreviated as "composition B", in some cases) as well as a water-soluble film made by using the above water-soluble resin composition (hereinafter, such film is abbreviated as "film B2", in some cases and the film B1 and film B2 are collectively abbreviated as "film B", in some cases).

DETAILED DESCRIPTION OF EMBODIMENTS OF THE INVENTION

The PVA to be used in the practice of the invention can be obtained by hydrolyzing a polyvinyl ester. As the polyvinyl ester, there may be mentioned polymers of such vinyl esters as vinyl formate, vinyl acetate, vinyl propionate, vinyl valerate, vinyl laurate, vinyl benzoate, vinyl stearate, vinyl pivalate and vinyl versatate. One or two or more of these can be used. Among them, vinyl acetate is preferred since it is available as a commercial product and advantageous from the cost viewpoint and the 1,2-glycol linkage formation is easy with the same.

From the viewpoint of improving the biodegradability of PVA, a small proportion of an α-olefin containing not more than 4 carbon atoms is preferably copolymerized with a vinyl ester. As the α-olefin containing not more than 4 carbon atoms, there may be mentioned ethylene, propylene, n-butene and isobutylene, among others. From the viewpoint of improving the biodegradability of the water-soluble film, ethylene is most preferred and, from the viewpoint of improving the solubility in water, propylene is most preferred. The content of the α-olefin to be copolymerized in PVA is 0.1 to 10 mole percent, preferably 0.5 to 5 mole percent. When the α-olefin content is less than 0.1 mole percent, the biodegradability improving effect may not be produced. When, conversely, that content is in excess of 10 mole percent, the degree of polymerization, hence the film strength, unfavorably tends to decrease. In particular when ethylene is used for copolymerization, the water solubility decreases and, therefore, the content thereof in PVA should preferably be not more than 5 mole percent.

In the practice of the invention, the PVA may contain a further monomer unit or units unless they are against the purpose of the invention. As the comonomer, there may be mentioned, among others, acrylic acid, salts thereof and acrylate esters such as methyl acrylate, ethyl acrylate, n-propyl acrylate, isopropyl acrylate, n-butyl acrylate, isobutyl acrylate, tert-butyl acrylate, 2-ethylhexyl acrylate, dodecyl acrylate and octadecyl acrylate; methacrylic acid, salts thereof and methacrylate esters such as methyl methacrylate, ethyl methacrylate, n-propyl methacrylate, isopropyl methacrylate, n-butyl methacrylate, isobutyl methacrylate, tert-butyl methacrylate, 2-ethylhexyl methacrylate, dodecyl methacrylate and octadecyl methacrylate; acrylamide and derivatives thereof such as N-methylacrylamide, N-ethylacrylamide, N,N-dimethylacrylamide, diacetone acrylamide, acrylamidopropanesulfonic acid or salts thereof and acrylamidopropyldimethylamine or salts or quaternary ammonium salts thereof; methacrylamide and derivatives thereof such as N-methylmethacrylamide, N-ethylmethacrylamide, methacrylamidopropanesulfonic acid or salts thereof, methacrylamidopropyldimethylamine or salts or quaternary ammonium salts thereof and N-methylolmethacrylamide or derivatives thereof; vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, dodecyl vinyl ether and stearyl vinyl ether; N-vinylamides such as N-vinylpyrrolidone, N-vinylformamide and N-vinylacetamide; allyl ethers having a polyalkylene oxide side chain; nitriles such as acrylonitrile and methacrylonitrile; vinyl halides such as vinyl chloride, vinylidene chloride, vinyl fluoride and vinylidene fluoride; allyl compounds such as allyl acetate and allyl chloride; maleic acid or salts or esters thereof; vinylsilyl compounds such as vinyltrimethoxysilane; propenyl acetate and the like. From the viewpoint of biodegradability of PVA, the level of modification with, or the content of, these other monomer units is generally not more than 5 mole percent.

The polyvinyl ester can be produced by any of the methods known in the art, for example by the solution polymerization, bulk polymerization, suspension polymerization or emulsion polymerization technique. The polymerization catalyst can appropriately be selected according to the method of polymerization from among azo catalysts, peroxide catalysts, redox catalyst systems and so on.

The hydrolysis reaction of the polyvinyl ester can be effected by applying the conventional technique of alcoholysis using an alkali catalyst or acid catalyst, or of hydrolysis, for instance. The hydrolysis reaction in the presence of NaOH as a catalyst with methanol as a solvent is expedient and most preferred among others.

In the composition A and film A according to the invention, it is essential, from the viewpoint of the odor and alkali resistance, that the degree of hydrolysis of PVA be at least 90 mole percent; preferably, it is not less than 95 mole percent and, more preferably, it is not less than 98 mole percent. If the degree of hydrolysis of PVA is less than 90 mole percent, a sufficient level of film stiffness may not be obtained under high humidity conditions, in particular, or the acetic acid odor may unfavorably increases with the lapse of time. The degree of hydrolysis can be determined by the method described in JIS K 6726.

In the composition B and film B according to the invention, it is essential that the degree of hydrolysis of PVA be 92 to 99 mole percent. Preferably, it is 94 to 96 mole percent. If the degree of hydrolysis of PVA is less than 92 mole percent, the alkali resistance of PVA may unfavorably decrease or the hygroscopicity thereof may increase. If, conversely, it exceeds 99 mole percent, the water solubility of film B will unfavorably decrease.

The degree of polymerization of PVA also influences the performance characteristics of the water-soluble film of the invention. The degree of polymerization of PVA may appropriately selected according to the intended use of the water-soluble film. From the film strength viewpoint, however, the degree of polymerization is preferably at least 500, more preferably not less than 700, still more preferably not less than 900 and, from the commercial productivity viewpoint, it is preferably not more than 3,000. In view of the impact resistance required of the water-soluble film in using the same as bags, a degree of polymerization of at least 1,000 is particularly preferred.

The 1,2-glycol linkage content of PVA is required to be at least 1.8 mole percent, preferably not less than 2.2 mole percent, more preferably not less than 2.4 mole percent. The 1,2-glycol linkage content can be controlled by various methods, for example by selecting the vinyl ester species, solvent, polymerization temperature and/or like factors and/or using vinylene carbonate as a comonomer. To control that content by selecting the polymerization temperature is an industrially preferred method of control in the practice of the invention. The polymerization temperature on that occasion should be not lower than 80° C. and preferably is not lower than 100° C., more preferably not lower than 120° C., still more preferably not lower than 150° C., most preferably not lower than 180° C.

There is no particular upper limit to the 1,2-glycol linkage content. However, raising the polymerization temperature or using vinylene carbonate as a comonomer to increase the 1,2-glycol linkage content results in a decrease in degree of polymerization. Therefore, for the use of the PVA as water-soluble films, the 1,2-glycol linkage content is preferably not more than 5 mole percent, more preferably not more than 4 mole percent, still more preferably not more than 3.5 mole percent.

In the practice of the invention, the PVA may have short-chain branches and the content thereof is preferably not less than 0.03 mole percent, more preferably not less than 0.05 mole percent, still more preferably not less than 0.08 mole percent. As the content of short chain branches in PVA increases, the crystallinity of PVA decreases and the water solubility thereof is improved to give preferable water-soluble films.

The content of short chain branches can be controlled by various methods, for example by selecting the vinyl ester species, solvent, polymerization temperature, etc. According to an industrially preferred method of control in the practice of the invention, that content is controlled through the polymerization temperature. The polymerization temperature is not lower than 80° C., preferably not lower than 100° C., more preferably not lower than 120° C., still more preferably not lower than 150° C., most preferably not lower than 180° C.

Generally, water-soluble films are transported to, and stored or used in high-temperature, high-humidity regions as well as cold regions and therefore they are required to have strength and toughness, in particular low-temperature impact strength. Therefore, various plasticizers are used to lower the glass transition temperature of the product films. In accordance with the present invention, a plasticizer is used for the purpose of improving the solubility in water, in particular, in addition to the purposes mentioned above.

The plasticizer to be used in the practice of the invention is not particularly restricted but may be any of those generally used as plasticizers for PVA. Thus, it includes, among others, polyhydric alcohols such as glycerol, diglycerol, trimethylolpropane, diethylene glycol, triethylene glycol, dipropylene glycol and propylene glycol; polyethers such as polyethylene glycol and polypropylene glycol; phenol derivatives such as bisphenol A and bisphenol S; amide compounds such as N-methylpyrrolidone; compounds derived from a polyhydric alcohol such as glycerol, pentaerythritol or sorbitol by addition of ethylene oxide; and the like. One or two or more of these can be used. Among them, glycerol, trimethylolpropane, diethylene glycol, triethylene glycol, dipropylene glycol and propylene glycol are preferred for the purpose of improving the solubility in water of the water-soluble resin composition and of the water-soluble film. Trimethylolpropane is most preferred since it is particularly high in water solubility improving effect.

The amount of the plasticizer is 1 to 50 parts by weight based on 100 parts by weight of PVA. When the amount is less than 1 part by weight, any substantial effect of incorporation of the plasticizer will not be produced. And the amount is more than 50 parts by weight, the plasticizer will bleed out to a significant extent, hence the resulting films will become poor in antiblock properties. From the viewpoint of the rate of dissolution of the resulting films in water, the plasticizer is used preferably in an amount not less than 20 parts by weight. From the viewpoint of the product film stiffness (processability on a bag making machine etc.), it is used preferably in an amount of not more than 40 parts by weight. For the purpose of improving the water solubility of the product films, a relatively high amount of the plasticizer is preferred. While the heat sealing temperature to be employed may vary according to various factors, a relatively high amount of the plasticizer, in particular, allows the use of a lower heat sealing temperature and is thus conducive to improvements in productivity in making films into bags. It is particularly preferred that the amount of the plasticizer be such that the heat sealing temperature for the product films becomes not higher than 170° C., more preferably not higher than 160° C. Furthermore, the amount of the plasticizer significantly influences the Young's modulus of the product films. From the viewpoint of the processability of the product films on a bag making machine or the like, the Young's modulus is preferably at least 1.5 kg/mm$^2$, more preferably not less than 2 kg/mm$^2$, and the amount of the plasticizer is preferably selected so that films having a Young's modulus falling within such range may be obtained.

The monosaccharide and/or polysaccharide to be used in the composition of the invention is not particularly restricted but includes such monosaccharides as glucose, fructose, invert sugar and xylose and such polysaccharides (inclusive of disaccharides and oligosaccharides) as maltose, lactose, sucrose, trehalose, palatinose, reducing malt sugar, reducing palatinose, reducing lactose, starch syrup, isomaltooligosaccharides, fructooligosaccharides, milk sugar oligosaccharides, soybean oligosaccharides, xylooligosaccharides, coupling sugar, cyclodextrin compounds, pullulan, pectin, agar, konnyaku mannan, polydextrose, xanthan gum and starch. Starch is most preferred among others.

The starch is not limited to any particular species but includes, among others, raw starch species derived from corn, wheat, potato, tapioca (cassava), taro, sweet potato, rice and the like, gelatinized (α-form) starch species derived therefrom, dextrin, oxidized starch, aldehyde starch, esterified starch, etherified starch, cationized starch, crosslinked starch and like modified starch species. One or two or more of these can be used. From the viewpoint of the processability of the product films on a bag making machine or the like, it is preferred that the compatibility between PVA and starch be not very good but the film surface have matting effects. Thus preferred are raw cornstarch, oxidized cornstarch, etherified cornstarch, phosphate esterified potato starch, acetylated wheat starch and the like. Oxidized cornstarch is particularly preferred since it causes formation of minute irregularities (unevenness) on the film surface.

In the composition of the invention, the amount of the monosaccharide and/or polysaccharide is 5 to 50 parts by weight, preferably 10 to 35 parts by weight, based on 100 parts by weight of PVA. When the amount is less than 5 parts by weight, the desired improving effect on the rate of dissolution of the product films in water will not be produced. Conversely, if the amount is more than 50 parts by weight, the product films will be low in strength. For the product films to have good antiblocking properties, an amount of more than 10 parts by weight is preferred.

The composition A2 of the present invention comprises (i) 100 parts by weight of a PVA having a 1,2-glycol linkage content of at least 1.8 mole percent and a degree of hydrolysis of at least 90 mole percent, (ii) 1 to 50 parts by weight of a plasticizer and (iii) 5 to 50 parts by weight of a monosaccharide and/or a polysaccharide and, further, (iv) 1 to 20 parts by weight of an inorganic filler. The film A2 produced by using such composition A2 shows good water solubility.

The composition B1 of the invention comprises (i') 100 parts by weight of a PVA having a 1,2-glycol linkage content of at least 1.8 mole percent and a degree of hydrolysis of 92 to 99 mole percent, (ii') 1 to 50 parts by weight of a plasticizer and (iv') 1 to 20 parts by weight of an inorganic filler. The film B1 produced by using such composition B1 also shows good water solubility.

The inorganic filler to be used in the composition of the invention includes, among others, silica, heavy or light or surface-treated calcium carbonate, aluminum hydroxide, aluminum oxide, titanium oxide, diatomaceous earth, barium sulfate, calcium sulfate, zeolite, zinc oxide, silicic acid, silicate salts, mica, magnesium carbonate, kaolin, halloysite, pyrophyllite, sericite and other clay and talc species. These may be used singly or two or more of them may be used in combination. In view of the dispersibility in PVA, in particular, silica is preferably used among others. From the antiblocking viewpoint, the inorganic filler preferably has a particle size of not less than 1 µm and, from the viewpoint of dispersibility in PVA, the particle size is preferably not more than 10 µm. For attaining both of the performance characteristics simultaneously, it is more preferable that the particle size be about 1 to 7 µm.

For the improvement in composition and film water solubility, it is essential that the amount of the inorganic filler be 1 to 20 parts by weight based on 100 parts by weight of PVA. Preferably, the amount of the inorganic filler is 3 to 20 parts by weight, more preferably 5 to 20 parts by weight, most preferably 10 to 20 parts by weight. When the inorganic filler is used in the amount of such ranges, films with better antiblocking properties can favorably be obtained. If the amount of the inorganic filler is more than 20 parts by weight, the dispersibility in PVA will lower and the inorganic filler will aggregate, tending to decrease the water solubility of the product films.

In accordance with the invention, the composition B2 can further comprise (iii') 5 to 50 parts by weight of the abovementioned monosaccharide and/or polysaccharide in addition to (1') 100 parts by weight of a PVA species having a 1,2-glycol linkage content of at least 1.8 mole percent and a degree of hydrolysis of 92 to 99 mole percent, (ii') 1 to 50 parts by weight of a plasticizer and (iv') 1 to 20 parts by weight of an inorganic filler. The water solubility of the product films can by further increased.

In the water-soluble resin composition of the invention, there may further be incorporated, where necessary, one or more of conventional additives, such as colorants, perfumes, extenders, antifoaming agents, release agents, ultraviolet absorbers and surfactants, each in an appropriate amount. For improving the releasability of the films formed or film-forming melt or solution from the metal surface of a die or drum of a film-producing machine, in particular, 0.01 to 5 parts by weight of a surfactant is preferably employed based on 100 parts by weight of PVA. Where necessary or appropriate, a PVA resin having a 1,2-glycol linkage content of less than 1.8 mole percent, carboxymethylcellulose, methylcellulose, hydroxymethylcellulose or a like water-soluble polymer may be employed in an amount not weakening the effects of the invention. In particular from the viewpoint of the water solubility improvement, the addition of a low viscosity type of carboxymethylcellulose is preferred.

The composition A1 of the invention can be produced by mixing, to PVA, a plasticizer and a monosaccharide and/or a polysaccharide (preferably starch), optionally together with another ingredient or ingredients, as mentioned above, by any appropriate method of blending.

The composition A2 of the invention can be produced by mixing, to PVA, a plasticizer, a monosaccharide and/or a polysaccharide (preferably starch) and an inorganic filler, optionally together with another ingredient or ingredients, by any appropriate method of blending.

The composition B of the invention can be produced by mixing, to PVA, a plasticizer and an inorganic filler, preferably with a monosaccharide and/or a polysaccharide (preferably starch), optionally together with another ingredient or ingredients, by any desirable method of blending.

The method of producing water-soluble films from the water-soluble composition of the invention is not particularly restricted but may be any of the film production methods used in producing films in general. Thus, for example, such film forming methods as film casting, wet process film formation, dry process film formation, film extrusion, melting film formation, coating process and inflation method can be employed. In preparing a film-forming solution from the water-soluble resin composition, water, dimethyl sulfoxide, dimethylformamide, dimethylacetamide, methanol, n-propanol, isopropanol, phenol and the like are used either singly or in admixture as the solvent for the water-soluble resin composition. For preparing a film-forming solution with the water-soluble resin composition uniformly dissolved therein, a mixture prepared by mixing up all the ingredients constituting the water-soluble resin composition may be dissolved in the solvent, or solutions prepared by dissolving the ingredients constituting the water-soluble resin composition respectively in the solvent may be mixed up. The film-forming solution preferably has a concentration of not higher than 50% by weight (the solvent content being at least 50% by weight) from the viscosity viewpoint. More preferably, it is not more than 30% by weight (the solvent content being at least 70% by weight) in view of the ease of formation of a matte surface on the films produced.

The temperature in the step of film formation is generally within the range of room temperature to 250° C. The films formed can be stretched or rolled under dry heat or wet heat conditions and the temperature on that occasion is generally within the range of room temperature to 270° C. The films after formation can be subjected to heat treatment at about 100 to 150° C., whereby the rate of dissolution can be controlled. Further, for improving the water-solubility of the films, the film surface is preferably subjected to matte processing, antiblocking agent spreading, or embossing.

The water-soluble film of the invention preferably has a Young's modulus of not less than 1.5 kg/mm$^2$, more preferably not less than 2 kg/mm$^2$. When the water-soluble film has a Young's modulus within the above range, it can be a film showing good processability on a bag-making machine or the like.

The thickness of the water-soluble film of the invention is not particularly restricted but preferably is 10 to 100 μm, more preferably 30 to 80 μm in particular from the viewpoint of balance between strength and water solubility.

The water-soluble film of the invention shows good antiblock properties without being subjected to any particular treatment. The antiblock properties of the film can be evaluated by measuring the film surface for angle of slip. The angle of slip of the film surface varies according to various factors such as the amount of the plasticizer and the degree of hydrolysis of PVA. For the water-soluble film of the invention, the angle of slip is preferably not greater than 60 degrees, more preferably not greater than 55 degrees. The angle of slip, so referred to herein, is the value obtained by measuring, according to JIS P 8147, the angle of slip of the free (matte) surface of the film conditioned at 23° C. and 50% RH. The sharper the angle of slip is, the better the antiblock properties are.

For further improving the antiblock properties of the water-soluble film of the invention, the film surface may be subjected, where necessary, to matte processing, spreading of an antiblocking powder such as silica or starch, and/or embossing. The matte processing of the film surface can be effected by providing the roll, which the film before drying contacts in the process of film making, with minute irregularities (unevenness). The embossing can be effected generally by nipping the film after formation between an embossing roll and a rubber roll under application of heat and/or pressure. While powder spreading is highly effective in preventing blocking, matte processing or embossing is preferred in preventing blocking since certain fields of application of the film do not allow powder spreading. For achieving higher blocking preventing effects, matte processing is particularly preferred.

The water-soluble film A of the invention shows a high rate of dissolution in water. The time required for complete dissolution in water at 25° C. (film thickness 40 μm) is preferably not longer than 130 seconds, more preferably not longer than 100 seconds.

The water-soluble film B of the invention shows a faster rate of dissolution in water than the film A. The time required for complete dissolution of the film B (film thickness 40 μm) in water at 20° C. is preferably not longer than 50 seconds, more preferably not longer than 40 seconds.

The time required for complete dissolution in water at 20° C., so referred to herein, is the value obtained by measuring the time (DT) until complete dissolution of the film according to the method described later in the examples section as the method of measuring the water solubility of the water-soluble film. When the film thickness is different from 40 μm, the value calculated on the 40 μm thickness basis using the formula (1) given later herein is reported.

The water-soluble film B of the invention shows a high rate of bag breaking or tearing in water. The bag breaking time in water at 20° C. (film thickness 40 μm) is preferably not longer than 30 seconds, more preferably not longer than 20 seconds.

The bag breaking time in water at 20° C., so referred to herein, is the value obtained by measuring the time (BT) until breakage of the film according to the method described later in the examples section as the method of measuring the water solubility of the water-soluble film. When the film thickness is different from 40 μm, the value calculated on the 40 μm thickness basis using the formula (2) given later herein is reported.

The biodegradability, after 28 days, of the water-soluble film of the invention is at least 60%, preferably not less than 70%, more preferably not less than 80%. While errors may be produced in regard to percent degradation owing to the fluctuations in sludge activity, the water-soluble film of the invention preferably shows a mean percent degradation value within the above range. The percent degradation, so referred to herein, is the percent degradation obtained by performing the biodegradability evaluation according to the method described in ISO 14851. The percent degradation can be determined from the carbon dioxide generation or oxygen consumption due to the decomposition.

EXAMPLES

The following examples illustrate the present invention specifically but never limit the scope of the present invention.

In the examples, "part(s)" and "%" mean "part(s) by weight" and "% by weight", respectively, unless otherwise specified.

[Methods of Analyzing PVA]

The analysis of PVA was carried out according to JIS K 6726, unless otherwise specified.

The 1,2-glycol linkage content and short-chain branch content of PVA were determined based on the measurements on a 500 MHz $^1$H NMR apparatus (JEOL GX-500), as follows.

(1) The 1,2-glycol linkage content of PVA can be determined based on specific peaks in the NMR spectrum. After hydrolysis to a degree of hydrolysis of at least 99.9 mole percent, the PVA was thoroughly washed with methanol and dried at 90° C. under reduced pressure for 2 days and then dissolved in DMSO-d6. After addition of several drops of trifluoroacetic acid, the resulting test sample was subjected to measurement on the 500 MHz $^1$H NMR apparatus (JEOL GX-500) at 80° C.

The peak at 3.2 to 4.0 ppm (integrated value A) is ascribable to the vinyl alcohol unit methine, and the peak at 3.25 ppm (integrated value B) to one methine of the 1,2-glycol linkage, and the 1,2-glycol linkage content can be calculated as follows:

1,2-glycol linkage content (mole percent)=(B/A)×100

(2) The short-chain branch (comprising two monomer units) content of PVA can be determined based on specific peaks in the NMR spectrum. After hydrolysis to a degree of hydrolysis of at least 99.9 mole percent, the PVA was thorough washed with methanol and dried at 90° C. under reduced pressure for 2 days and then dissolved in DMSO-d6 and the resulting sample (1) was subjected to $^1$H NMR spectrometry at 500 MHz, while the same PVA was dissolved in D$_2$O and the resulting sample (2) was subjected to $^{13}$C NMR spectrometry at 125.65 MHz using the JEOL GX-500 apparatus.

For the sample (1), the peak at 3.2 to 4.0 ppm (integrated value C) is ascribable to the vinyl alcohol unit methine and the peak at 3.52 ppm (integrated value D) to the terminal alcohol methylene and, for the sample (2), the peaks at 60.95 to 61.65 ppm (integrated value E) are ascribable to all terminal alcohol methylenes and the peak at 60.95 to 61.18 ppm (integrated value F) to the short-chain branch terminal alcohol methylenes. The short-chain branch content can be calculated as follows:

Short-chain branch content (mole percent)=[(D/2)/C]×(F/E)×100

[Method of Measuring the Water Solubility of the Water-Soluble Film]

A constant temperature bath maintained at 20° C. was equipped with a magnetic stirrer. A one-liter beaker containing 1 liter of distilled water was placed in the bath and the beaker contents are stirred at 250 rpm using a 5 cm rotor. After arrival of the temperature of the distilled water in the beaker at 20° C., the water solubility measurement was started. (In cases where the measurement was carried out at 10° C. and 15° C., the above temperature conditions were adjusted accordingly and the same procedure was followed.)

A 40×40 mm square specimen was cut from a 40-μm-thick film and fixed on a slide mount and immersed in the water stirred at 20° C., and the state of dissolution of the film was observed. The time until breakage of the film (BT) and the time until complete dissolution of the film (DT) were measured in seconds. When the film used had a thickness different from 40 μm, the measured value was converted to the value based on the film thickness of 40 μm according to the formulas (1) and (2) given below.

Dissolution time (DT)(seconds)=[40/film thickness (μm)]²×sample bag dissolution time (seconds)     (1)

Breakage time (BT)(seconds)=[40/film thickness (μm)]²×sample bag breaking time (seconds)     (2)

[Method of Measuring the Young's Modulus]

Film specimens having a thickness of 40 μm and a width of 10 mm were conditioned at 20° C. and 65% RH and subjected to tensile testing using an autograph. The chuck distance was 50 mm and the rate of pulling was 500 mm/minute. The Young's modulus was calculated from the values obtained at an initial stage of pulling. The greater this value is, the better the processability is.

[Method of Evaluating the Biodegradability]

Acclimatized sludge (30 mg; 1:1 mixture of sludge obtained from a sewage treatment facility on the day of start of testing and sludge acclimatized in an aqueous solution of polyvinyl alcohol for 1 month) and 30 mg of a sample were added to 300 ml of an inorganic liquid medium and incubated at 25° C. for 28 days using a coulometer (Ohkura Electric Co., Ltd. model OM 3001A). The biodegradability was determined based on the measured amount of oxygen consumed for biodegradation.

Example 1

A 5-liter pressure reactor equipped with a stirrer, nitrogen inlet port and initiator inlet port was charged with 3,000 g of vinyl acetate and 0.090 g of tartaric acid, and the system was purged with nitrogen by three repetitions of the procedure comprising raising the reactor inside pressure to 2.0 MPa while bubbling with nitrogen gas at room temperature, followed by depressurization after 10 minutes of standing. An initiator solution was prepared by dissolving 2,2'-azobis (N-butyl-2-methylpropionamide) in methanol to a concentration of 0.1 g/L, followed by purging with nitrogen by bubbling with nitrogen gas. The reactor inside temperature was then raised to 150° C. The reactor inside pressure at that time was 0.8 MPa. The polymerization was then started by injecting 8.0 ml of the initiator solution into the system. During polymerization, the polymerization temperature was maintained at 150° C. and the above initiator solution was added continuously at a rate of 13.6 ml/hr. During polymerization, the reactor inside pressure was 0.8 MPa. After the lapse of 3 hours, the polymerization was stopped by cooling. The solid content at that time was 25%. Then, the unreacted vinyl acetate monomer was removed at 30° C. under reduced pressure while occasionally adding methanol. A methanol solution of polyvinyl acetate (concentration 33%) was thus obtained. Methanol was added to the polyvinyl acetate solution to adjust the concentration to 25%. To 400 g of the thus-adjusted solution of polyvinyl acetate in methanol (polyvinyl acetate content in the solution=100 g) was added, at 40° C., 2.3 g of an alkali solution (10% methanol solution of NaOH) (mole ratio (MR) relative to the vinyl acetate units=0.025), and hydrolysis was thereby effected. The gel formed at about 20 minutes after alkali addition was ground in a mill and allowed to stand for 1 hour and the hydrolysis was thereby allowed to further proceed. Then, 1,000 g of methyl acetate was added to neutralize the residual alkali. After confirmation of the completion of neutralization using phenolphthalein as an indicator, the white solid of PVA was filtered off and 1,000 g of methanol was added thereto and the mixture was allowed to stand at room temperature for 3 hours for effecting washing. This washing procedure was repeated three times in all. Thereafter, the PVA recovered by centrifugation was allowed to stand in a drier at 70° C. for 2 days to give dry PVA (PVA-1).

The PVA (PVA-1) obtained had a degree of hydrolysis of 99 mole percent.

Separately, the methanol solution of polyvinyl acetate as obtained by removing the unreacted vinyl acetate monomer after polymerization was hydrolyzed at an alkali mole ratio of 0.5. The gel formed was ground and allowed to stand at 60° C. for 5 hours to drive the hydrolysis to completion, followed by 3 days of Soxhlet washing with methanol and further followed by 3 days of drying at 80° C. under reduced pressure to give purified PVA. The degree of polymerization of the purified PVA was determined by the conventional method described in JIS K 6726 and found to be 1,200. The 1,2-glycol linkage content of the purified PVA was calculated as mentioned above based on the results obtained on the 500 MHz proton NMR (JEOL GX-500) apparatus and found to be 2.5 mole percent.

To 100 parts by weight of this PVA were added 20 parts by weight of oxidized cornstarch as a starch species, 30 parts by weight of trimethylolpropane as a plasticizer, 10 parts by weight of silica having a particle size of 3 μm as an inorganic filler and water to give a uniform 10% aqueous solution (water content 90%). The solution was cast onto a heated matte roll at 70° C. and dried to give a 40-μm-thick film, which was further heat-treated at 100° C. for 10 minutes. The water solubility (time until complete dissolution) of this film was 83 seconds at 20° C. Further, the Young's modulus and biodegradability were determined. The results obtained are shown in Table 4.

This film was made into 10×15 cm bags. Sodium carbonate (40 g) as an alkaline substance was placed in each bag and tightly enclosed by heat sealing. This filled packing bag was further wrapped in an aluminum/polyethylene laminate film, followed by heat sealing to attain double sealing for preventing water or the plasticizer from scattering out of the packing bag with the alkaline substance enclosed therein. In an accelerated long-term storability test, this bag was placed in a thermostat at 50° C. and allowed to stand. After 1 month, it was taken out and the change in water solubility of the packaging film with time was examined. The evaluation results are shown in Table 4. The results were good; no substantial decrease in water solubility was observed even after one month of standing at 50° C. The film appearance was good; no yellowing nor decrease in transparency was observed. No emission of odor (in particular acetic acid odor) was observed.

Example 2

The polymerization and hydrolysis were carried out in the same manner as in Example 1 except that the polymerization temperature was changed to 180° C. The conditions during polymerization are shown in Table 1 and the values obtained by analyzing the PVA obtained (PVA-2) are shown in Table 2.

Following the same procedure as in Example 1, a film was produced according to the formulation given in Table 3 and evaluated for physical properties. The results obtained are shown in Table 4.

Example 3

A 50-liter pressure reactor equipped with a stirrer, nitrogen inlet port, ethylene inlet port, initiator inlet port and delayed solution addition port was charged with 29.4 kg of vinyl acetate and 0.6 kg of methanol, the temperature was raised to 60° C. and the system was purged with nitrogen by bubbling with nitrogen gas for 30 minutes. Ethylene was then introduced until the reactor inside pressure reached 1.8 MPa. An initiator solution was prepared by dissolving 2,2'-azobis(N-butyl-2-methylpropionamide) in methanol to a concentration of 0.1 g/L, followed by purging with nitrogen by bubbling with nitrogen gas. The reactor inside temperature was then raised to 150° C. The reactor inside temperature was adjusted to 150° C., and the polymerization was then started by injecting 45 ml of the initiator solution into the system. During polymerization, the reactor inside pressure was maintained at 1.8 MPa by introducing ethylene, the polymerization temperature was maintained at 150° C. and the above initiator solution was added continuously at a rate of 185 ml/hr. After the lapse of 3 hours, when the conversion was 25%, the polymerization was stopped by cooling. The reactor was opened and the unreacted ethylene was released, followed by bubbling with nitrogen gas for complete ethylene elimination. Then, the unreacted vinyl acetate monomer was removed under reduced pressure to give a methanol solution of polyvinyl acetate. Methanol was added to the polyvinyl acetate solution to adjust the concentration to 30%. To 333 g of the thus-adjusted solution of polyvinyl acetate in methanol (polyvinyl acetate content in the solution=100 g) was added 9.3 g of an alkali solution (10% methanol solution of NaOH) (mole ratio (MR) relative to the vinyl acetate units=0.02), and hydrolysis was thereby effected. The gel formed in the system at about 5 minutes after alkali addition was ground in a mill and allowed to stand for 1 hour and the hydrolysis was thereby allowed to further proceed. Then, 1,000 g of methyl acetate was added to neutralize the residual alkali. After confirmation of the completion of neutralization using phenolphthalein as an indicator, the white solid of PVA was filtered off and 1,000 g of methanol was added thereto and the mixture was allowed to stand at room temperature for 3 hours for effecting washing. This washing procedure was repeated three times in all. Thereafter, the PVA recovered by centrifugation was allowed to stand in a drier at 70° C. for 2 days to give dry PVA (PVA-3). The ethylene-modified PVA obtained was analyzed by the methods mentioned above. PVA-3 has a degree of polymerization of 1,150, a degree of hydrolysis of 95 mole percent and a modifier ethylene content of 3 mole percent.

The analytical values for the resin obtained (PVA-3) are shown in Table 2.

Following the same procedure as used in Example 1, a film was produced according to the formulation given in Table 3 and evaluated for physical properties. The results obtained are shown in Table 4.

Example 4

The polymerization and hydrolysis were carried out in the same manner as in Example 1 except that propylene was used as the purging gas in lieu of nitrogen and that the conditions during polymerization were modified as shown in Table 1. The analytical values for the PVA obtained (PVA-4) are shown in Table 2. As for the modifier propylene content, the polymer resulting from hydrolysis to a degree of hydrolysis of 99.9 mole percent was subjected to DSC (differential scanning colorimetry) and the melting point thereof was determined, and the modifier content [Δ(mole percent)] was calculated based on that melting point [Tm (° C.)] according to the following formula:

$$\Delta = (234.1 - Tm)/7.55$$

Following the same procedure as used in Example 1, a film was produced according to the formulation shown in Table 3 and evaluated for physical properties. The results obtained are shown in Table 4.

Example 5

A 5-liter four-necked separable flask equipped with a stirrer, nitrogen inlet port, initiator inlet port and reflux cooler was charged with 2,000 g of vinyl acetate, 400 g of methanol and 78.8 g of vinylene carbonate, and the system was purged with nitrogen by bubbling with nitrogen gas at room temperature for 30 minutes. After adjusting the above polymerizer inside temperature to 60° C., the polymerization was started by adding 0.9 g of α,α'-azobisisobutyronitrile as an initiator. During polymerization, the polymerization temperature was maintained at 60° C. and, after the lapse of 4 hours, the polymerization was stopped by cooling. The solid concentration at that time was 55%. Then, the unreacted vinyl acetate monomer was removed at 30° C. under reduced pressure with occasional addition of methanol to give a methanol solution of polyvinyl acetate (concentration 33%). Methanol was added to the polyvinyl acetate solution to adjust the concentration to 25%. To 400 g of the thus-adjusted solution of polyvinyl acetate in methanol (polyvinyl acetate content in the solution=100 g) was added, at 40° C., 46.4 g of an alkali solution (10% methanol solution of NaOH) (mole ratio (MR) relative to the vinyl acetate units=0.020), and hydrolysis was thereby effected. The gel formed at about 1 minutes after alkali addition was ground in a mill and allowed to stand for 1 hour and the hydrolysis was thereby allowed to further proceed. Then, 1,000 g of methyl acetate was added to neutralize the residual alkali. After confirmation of the completion of neutralization using phenolphthalein as an indicator, the white solid of PVA was filtered off and 1,000 g of methanol was added thereto and the mixture was allowed to stand at room temperature for 3 hours for effecting washing. This washing procedure was repeated three times in all. Thereafter, the PVA recovered by centrifugation was allowed to stand in a drier at 70° C. for 2 days to give dry PVA (PVA-5).

The PVA obtained (PVA-5) had a degree of hydrolysis of 99 mole percent.

Separately, the methanol solution of polyvinyl acetate as obtained by removing the unreacted vinyl acetate monomer after polymerization was hydrolyzed at an alkali mole ratio of 0.5. The gel formed was ground and allowed to stand at 60° C. for 5 hours to drive the hydrolysis to completion, followed by 3 days of Soxhlet washing with methanol and further followed by 3 days of drying at 80° C. under reduced pressure to give purified PVA. The degree of polymerization of the purified PVA was determined by the conventional method described in JIS K 6726 and found to be 1,700. The 1,2-glycol linkage content of the purified PVA was calculated as mentioned above based on the results obtained on the 500 MHz $^1$H NMR (JEOL GX-500) apparatus and found to be 3.0 mole percent.

Following the same procedure as used in Example 1, a film was produced according to the formulation given in Table 3 and evaluated for physical properties. The results obtained are shown in Table 4.

Examples 6 and 7

The polymerization and hydrolysis were carried out in the same manner as in Example 1 except that the conditions during polymerization were modified as shown in Table 1. The analytical values for the PVA obtained are shown in Table 2.

Following the same procedure as used in Example 1, films were produced according to the formulations shown in Table 3 and evaluated for physical properties. The results obtained are shown in Table 4.

Comparative Examples 1 to 9

Films were produced in the same manner as in Example 1 except that the PVA synthesis conditions and PVA composition as well as the starch, plasticizer and inorganic filler species and amounts thereof were modified as shown below in Tables 1 to 3. The films were subjected to various evaluation tests. The evaluation results are shown in Table 4.

The film of Comparative Example 8 was low in strength and also poor in heat sealability, hence it was difficult to make it into bags and subject them to alkaline substance packaging test. The film of Comparative Example 9 showed blocking due to marked bleeding out of the plasticizer and was practically unusable.

Example 8

A 5-liter pressure reactor equipped with a stirrer, nitrogen inlet port and initiator inlet port was charged with 3,000 g of vinyl acetate and 0.090 g of tartaric acid, and the system was purged with nitrogen by three repetitions of the procedure comprising raising the reactor inside pressure to 2.0 MPa while bubbling with nitrogen gas at room temperature, followed by depressurization after 10 minutes of standing. An initiator solution was prepared by dissolving 2,2'-azobis (N-butyl-2-methylpropionamide) in methanol to a concentration of 0.1 g/L, followed by purging with nitrogen by bubbling with nitrogen gas. The reactor inside temperature was then raised to 150° C. The reactor inside pressure at that time was 0.8 MPa. The polymerization was then started by injecting 8.0 ml of the initiator solution into the system. During polymerization, the polymerization temperature was maintained at 150° C. and the above initiator solution was added continuously at a rate of 13.6 ml/hr. During polymerization, the reactor inside pressure was 0.8 MPa. After the lapse of 3 hours, the polymerization was stopped by cooling. The solid content at that time was 25%. Then, the unreacted vinyl acetate monomer was removed at 30° C. under reduced pressure while occasionally adding methanol. A methanol solution of polyvinyl acetate (concentration 33%) was thus obtained. Methanol was added to the polyvinyl acetate solution to adjust the concentration to 25%. To 400 g of the thus-adjusted solution of polyvinyl acetate in methanol (polyvinyl acetate content in the solution=100 g) was added, at 40° C., 2.3 g of an alkali solution (10% methanol solution of NaOH) (mole ratio (MR) relative to the vinyl acetate units=0.010), and hydrolysis was thereby effected. The gel formed at about 20 minutes after alkali addition was ground in a mill and allowed to stand for 1 hour and the hydrolysis was thereby allowed to further proceed. Then, 1,000 g of methyl acetate was added to neutralize the residual alkali. After confirmation of the completion of neutralization using phenolphthalein as an indicator, the white solid of polyvinyl alcohol was filtered off and 1,000 g of methanol was added thereto and the mixture was allowed to stand at room temperature for 3 hours for effecting washing. This washing procedure was repeated three times in all. Thereafter, the PVA recovered by centrifugation was allowed to stand in a drier at 70° C. for 2 days to give dry PVA (PVA-21).

The PVA (PVA-21) obtained had a degree of hydrolysis of 95 mole percent.

Separately, the methanol solution of polyvinyl acetate as obtained by removing the unreacted vinyl acetate monomer after polymerization was hydrolyzed at an alkali mole ratio of 0.5. The gel formed was ground and allowed to stand at 60° C. for 5 hours to drive the hydrolysis to completion, followed by 3 days of Soxhlet washing with methanol and further followed by 3 days of drying at 80° C. under reduced pressure to give purified PVA. The degree of polymerization of the purified PVA was determined by the conventional method described in JIS K 6726 and found to be 1,200. The 1,2-glycol linkage content of the purified PVA was calculated as mentioned above based on the results obtained on the 500 MHz $^1$H NMR (JEOL GX-500) apparatus and found to be 2.5 mole percent.

To 100 parts by weight of the polyvinyl alcohol obtained were added 40 parts by weight of trimethylolpropane as a plasticizer, 20 parts by weight of oxidized cornstarch, 10 parts by weight of silica having a mean particle size of 3 μm and 900 parts by weight of water and the mixture was stirred at 90° C. to give an aqueous solution with a PVA concentration of 10%. The aqueous solution was thoroughly defoamed and cast onto a surface-matted polyester film and dried at 90° C., followed by 10 minutes of heat treatment at 100° C. The film obtained had a thickness of 40 μm and was a matte film with 1-μm-high irregularities (unevenness) on one side.

The film obtained was used for water solubility at 20° C. and Young's modulus. The results obtained are shown in Table 8.

Example 9

The polymerization and hydrolysis were carried out in the same manner as in Example 8 except that the polymerization temperature was changed to 120° C. The PVA synthesis conditions are shown in Table 5 and the analytical values for the PVA obtained (PVA-22) are shown in Table 6.

Following the same procedure as in Example 8, a film was produced according to the formulation given in Table 7 and evaluated for water solubility and Young's modulus. The results obtained are shown in Table 8.

Example 10

The polymerization and hydrolysis were carried out in the same manner as in Example 8 except that the polymerization temperature was changed to 180° C. The PVA synthesis conditions are shown in Table 5 and the analytical values for the PVA obtained (PVA-23) are shown in Table 6.

Following the same procedure as in Example 8, a film was produced according to the formulation given in Table 7 and evaluated for water solubility and Young's modulus. The results obtained are shown in Table 8.

Examples 11 and 13

Using the PVA obtained in Example 8 (PVA-21), films were produced according to the formulations given in Table 7 and evaluated for water solubility and Young's modulus. The results obtained are shown in Table 8.

Example 12

The polymerization and hydrolysis were carried out in the same manner as in Example 8 except that the PVA synthesis conditions were modified as shown in Table 5. The analytical values for the PVA obtained (PVA-30) are shown in Table 6.

Following the same procedure as in Example 8, a film was produced according to the formulation given in Table 7 and evaluated for water solubility and Young's modulus. The results are shown in Table 8.

Example 14

A 50-liter pressure reactor equipped with a stirrer, nitrogen inlet port, ethylene inlet port, initiator inlet port and delayed solution addition port was charged with 29.4 kg of vinyl acetate and 0.6 kg of methanol, the temperature was raised to 60° C. and the system was purged with nitrogen by bubbling with nitrogen gas for 30 minutes. Ethylene was then introduced until the reactor inside pressure reached 1.8 MPa. An initiator solution was prepared by dissolving 2,2'-azobis(N-butyl-2-methylpropionamide) in methanol to a concentration of 0.1 g/L, followed by purging with nitrogen by bubbling with nitrogen gas. The reactor inside temperature was adjusted to 150° C., and the polymerization was then started by injecting 45 ml of the initiator solution into the system. During polymerization, the reactor inside pressure was maintained at 1.8 MPa by introducing ethylene, the polymerization temperature was maintained at 150° C. and the above initiator solution was added continuously at a rate of 185 ml/hr. After the lapse of 3 hours, when the conversion was 25%, the polymerization was stopped by cooling. The reactor was opened and the unreacted ethylene was released, followed by bubbling with nitrogen gas for complete ethylene elimination. Then, the unreacted vinyl acetate monomer was removed under reduced pressure to give a methanol solution of polyvinyl acetate. Methanol was added to the polyvinyl acetate solution to adjust the concentration to 30%. To 333 g of the thus-adjusted solution of polyvinyl acetate in methanol (polyvinyl acetate content in the solution=100 g) was added 9.3 g of an alkali solution (10% methanol solution of NaOH) (mole ratio (MR) relative to the vinyl acetate units=0.011), and hydrolysis was thereby effected. The gel formed in the system at about 5 minutes after alkali addition was ground in a mill and allowed to stand for 1 hour and the hydrolysis was thereby allowed to further proceed. Then, 1,000 g of methyl acetate was added to neutralize the residual alkali. After confirmation of the completion of neutralization using phenolphthalein as an indicator, the white solid of PVA was filtered off and 1,000 g of methanol was added thereto and the mixture was allowed to stand at room temperature for 3 hours for effecting washing. This washing procedure was repeated three times in all. Thereafter, the PVA recovered by centrifugation was allowed to stand in a drier at 70° C. for 2 days to give dry PVA (PVA-24). The ethylene-modified PVA obtained was analyzed by the methods mentioned above. PVA-24 has a degree of polymerization of 1,150, a degree of hydrolysis of 95 mole percent and a modifier ethylene content of 3 mole percent. The analytical values for the PVA obtained (PVA-24) are shown in Table 6.

Following the same procedure as used in Example 8, a film was produced according to the formulation given in Table 7 and evaluated for water solubility and Young's modulus. The results obtained are shown in Table 8.

Example 15

The polymerization and hydrolysis were carried out in the same manner as in Example 8 except that propylene was used as the purging gas in lieu of nitrogen and that the conditions during polymerization were modified as shown in Table 5. The analytical values for the PVA obtained (PVA-25) are shown in Table 6. As for the modifier propylene content, the polymer resulting from hydrolysis to a degree of hydrolysis of 99.9 mole percent was subjected to DSC and the melting point thereof was determined, and the modifier content [Δ(mole percent)] was calculated based on that melting point [Tm (° C.)] according to the following formula:

$$\Delta = (234.1 - Tm)/7.55$$

Following the same procedure as used in Example 8, a film was produced according to the formulation shown in Table 7 and evaluated for water solubility and Young's modulus. The results obtained are shown in Table 8.

Example 16

A 5-liter four-necked separable flask equipped with a stirrer, nitrogen inlet port, inlet port and reflux cooler was charged with 2,000 g of vinyl acetate, 400 g of methanol and 78.8 g of vinylene carbonate, and the system was purged with nitrogen by bubbling with nitrogen gas at room temperature for 30 minutes. After adjusting the above polymerizer inside temperature to 60° C., the polymerization was started by adding 0.9 g of α,α'-azobisisobutyronitrile as an initiator. During polymerization, the polymerization temperature was maintained at 60° C. and, after the lapse of 4 hours, the polymerization was stopped by cooling. The solid concentration at that time was 55%. Then, the unreacted vinyl acetate monomer was removed at 30° C. under reduced pressure with occasional addition of methanol to give a methanol solution of polyvinyl acetate (concentration 33%). Methanol was added to the polyvinyl acetate solution to adjust the concentration to 25%. To 400 g of the thus-adjusted solution of polyvinyl acetate in methanol (polyvinyl acetate content in the solution=100 g) was added, at 40° C., 46.4 g of an alkali solution (10% methanol solution of NaOH) (mole ratio (MR) relative to the vinyl acetate units=0.010), and hydrolysis was thereby effected. The gel formed at about 1 minute after alkali addition was ground in a mill and allowed to stand for 1 hour and the hydrolysis was thereby allowed to further proceed. Then, 1,000 g of methyl acetate was added to neutralize the residual alkali. After confirmation of the completion of neutralization using phenolphthalein as an indicator, the white solid of PVA was filtered off and 1,000 g of methanol was added thereto and the mixture was allowed to stand at room temperature for 3 hours for effecting washing. This washing procedure was repeated three times in all. Thereafter, the PVA recovered by centrifugation was allowed to stand in a drier at 70° C. for 2 days to give dry PVA (PVA-29).

The PVA obtained (PVA-29) had a degree of hydrolysis of 95 mole percent.

Separately, the methanol solution of polyvinyl acetate as obtained by removing the unreacted vinyl acetate monomer after polymerization was hydrolyzed at an alkali mole ratio of 0.5. The gel formed was ground and allowed to stand at 60° C. for 5 hours to drive the hydrolysis to completion, followed by 3 days of Soxhlet washing with methanol and further followed by 3 days of drying at 80° C. under reduced pressure to give purified PVA. The degree of polymerization of the purified PVA was determined by the conventional method described in JIS K 6726 and found to be 1,700. The 1,2-glycol linkage content of the purified PVA was calculated as mentioned above based on the results obtained on the 500 MHz $^1$H NMR (JEOL GX-500) apparatus and found to be 3.0 mole percent.

Following the same procedure as used in Example 8, a film was produced according to the formulation given in Table 7 and evaluated for water solubility and Young's modulus. The results are shown in Table 8.

Comparative Examples 10 to 13

The polymerization and hydrolysis were carried out in the same manner as in Example 8 except that the PVA synthesis conditions were modified as shown in Table 5. The analytical values for the PVA obtained are shown in Table 6.

TABLE 1

| | PVA species | Target polymerization temperature | Pressure during polymerization | Conversion | Alkali mole ratio |
|---|---|---|---|---|---|
| Example 1 | PVA-1 | 150° C. | 0.8 MPa | 25% | 0.025 |
| Example 2 | PVA-2 | 180° C. | 1.2 Mpa | 10% | 0.025 |
| Example 3 | PVA-3 | 150° C. | 1.8 Mpa | 25% | 0.020 |
| Example 4 | PVA-4 | 150° C. | 1.7 Mpa | 25% | 0.020 |
| Example 5 | PVA-5 | 60° C. | — | 55% | 0.020 |
| Example 6 | PVA-6 | 150° C. | 0.8 MPa | 25% | 0.010 |
| Example 7 | PVA-7 | 120° C. | 0.4 Mpa | 35% | 0.025 |
| Comparative Example 3 | PVA-8 | 150° C. | 0.8 Mpa | 25% | 0.005 |
| Comparative Example 5 | PVA-9 | 60° C. | — | 55% | 0.025 |
| Comparative Example 6 | PVA-10 | 60° C. | — | 55% | 0.005 |
| Comparative Example 7 | PVA-11 | 60° C. | — | 55% | 0.025 |

TABLE 2

| PVA species | 1,2-Glycol content | Degree of polymerization | Degree of hydrolysis | Short-chain branch content | Comonomer content | (Note) Modifier |
|---|---|---|---|---|---|---|
| PVA-1 | 2.5 mol % | 1200 | 99 mol % | 0.084 mol % | 0 mol % | |
| PVA-2 | 2.9 mol % | 920 | 99 mol % | 0.124 mol % | 0 mol % | |
| PVA-3 | 2.4 mol % | 1150 | 95 mol % | 0.083 mol % | 3 mol % | Ethylene-modified |
| PVA-4 | 2.4 mol % | 1100 | 99 mol % | 0.087 mol % | 3 mol % | Propylene-modified |
| PVA-5 | 3.0 mol % | 1700 | 99 mol % | 0 mol % | 1.4 mol % | Vinylene carbonate-modified |
| PVA-6 | 2.5 mol % | 1200 | 95 mol % | 0.084 mol% | 0 mol % | |
| PVA-7 | 2.2 mol % | 1700 | 99 mol % | 0.043 mol% | 0 mol % | |
| PVA-8 | 2.5 mol % | 1200 | 88 mol % | 0.084 mol% | 0 mol % | |
| PVA-9 | 1.6 mol % | 1700 | 99 mol % | 0 mol % | 0 mol % | |
| PVA-10 | 1.6 mol % | 1700 | 88 mol % | 0 mol % | 0 mol % | |
| PVA-11 | 1.6 mol % | 1400 | 99 mol % | 0 mol % | 2 mol % | Sulfonic acid-modified |

Following the same procedure as used in Example 8, films were produced according to the formulations shown in Table 7 and evaluated for water solubility and Young's modulus. The results are shown in Table 8.

Comparative Example 14

A 10% aqueous solution was prepared by adding 900 parts by weight of water to 100 parts by weight of polyvinyl alcohol (PVA-28) with a 1,2-glycol linkage content of 1.6 mole percent, a degree of polymerization of 1,400 and a degree of hydrolysis of 95 mole percent, followed by stirring at 90° C. The aqueous solution was thoroughly defoamed and then cast onto a polyester film and dried at 90° C., followed by 10 minutes of heat treatment at 100° C. The water solubility and Young's modulus of the thus-obtained film were as shown in Table 8.

TABLE 3

| | PVA species | Starch (wt parts*) | Plasticizer (wt parts*) | Inorganic filler (wt parts*) |
|---|---|---|---|---|
| Example 1 | PVA-1 | Oxidized cornstarch (20) | Trimethylolpropane (30) | Silica (10) |
| Example 2 | PVA-2 | Etherified starch (20) | Glycerol (30) | Silica (10) |
| Example 3 | PVA-3 | Trehalose (20) | Trimethylolpropane (30) | Silica (10) |
| Example 4 | PVA-4 | Oxidized cornstarch (20) | Trimethylolpropane (30) | Silica (10) |
| Example 5 | PVA-5 | Oxidized cornstarch (20) | Trimethylolpropane (30) | Silica (10) |
| Example 6 | PVA-6 | Oxidized cornstarch (20) | Trimethylolpropane (20) | — (0) |
| Example 7 | PVA-7 | Oxidized cornstarch (20) | Trimethylolpropane (30) | Talc (10) |
| Comparative Example 1 | PVA-1 | Oxidized cornstarch (20) | — (0) | — (0) |
| Comparative Example 2 | PVA-2 | — (0) | Trimethylolpropane (30) | — (0) |
| Comparative Example 3 | PVA-8 | Oxidized cornstarch (20) | Trimethylolpropane (30) | Silica (10) |

TABLE 3-continued

| | PVA species | Starch (wt parts*) | Plasticizer (wt parts*) | Inorganic filler (wt parts*) |
|---|---|---|---|---|
| Comparative Example 4 | PVA-1 | — (0) | — (0) | — (0) |
| Comparative Example 5 | PVA-9 | Oxidized cornstarch (20) | Trimethylolpropane (30) | Silica (10) |
| Comparative Example 6 | PVA-10 | Oxidized cornstarch (20) | Trimethylolpropane (30) | Silica (10) |
| Comparative Example 7 | PVA-11 | Oxidized cornstarch (20) | Trimethylolpropane (30) | Silica (10) |
| Comparative Example 8 | PVA-1 | Oxidized cornstarch (70) | Trimethylolpropane (30) | Silica (10) |
| Comparative Example 9 | PVA-1 | Oxidized cornstarch (20) | Trimethylolpropane (60) | Silica (10) |

*Per 100 weight parts of PVA.

TABLE 4

| | Water solubility (sec) (BT/DT)*1 | Water solubility after alkaline substance pack-aging (sec) (BT/DT)*1 | Young's modulus (kg/mm²) | Bio-degrad-ability*2 | Acetic acid odor |
|---|---|---|---|---|---|
| Example 1 | 42/83 | 42/84 | 3.6 | ○ | No |
| Example 2 | 32/63 | 33/65 | 4.0 | ⊚ | No |
| Example 3 | 26/50 | 26/50 | 3.2 | ⊚ | No |
| Example 4 | 46/92 | 46/92 | 3.8 | ⊚ | No |
| Example 5 | 49/101 | 50/102 | 2.9 | ○ | No |
| Example 6 | 14/26 | 40/79 | 2.5 | ○ | Slight |
| Example 7 | 60/123 | 60/124 | 3.7 | ○ | No |
| Comparative Example 1 | 78/150 | 80/150 | 6.4 | ○ | No |
| Comparative Example 2 | 101/195 | 102/197 | 2.2 | ○ | No |
| Comparative Example 3 | 9/18 | 38/78 | 1.3 | ○ | Yes |
| Comparative Example 4 | 130/250 | 132/252 | 3.4 | ○ | No |
| Comparative Example 5 | Insoluble | Insoluble | 2.2 | ○ | No |
| Comparative Example 6 | 10/22 | Insoluble | 0.2 | ○ | Yes |
| Comparative Example 7 | 7/18 | 7/18 | 3.4 | X | No |

*1 BT: time until film breakage, DT: time until complete film dissolution.
*2 Percent degradation less than 60% - X; not less than 60% but less than 70% - Δ; not less than 70% but less than 80% - ○; not less than 80% - ⊚.

TABLE 5

| | PVA species | Target polymerization temperature | Pressure during poly-merization | Conver-sion | Alkali mole ratio |
|---|---|---|---|---|---|
| Example 8 | PVA-21 | 150° C. | 0.8 MPa | 25% | 0.010 |
| Example 9 | PVA-22 | 120° C. | 0.4 Mpa | 35% | 0.011 |
| Example 10 | PVA-23 | 180° C. | 1.2 Mpa | 10% | 0.009 |
| Example 11 | PVA-21 | 150° C. | 0.8 Mpa | 25% | 0.010 |
| Example 12 | PVA-30 | 150° C. | 0.8 Mpa | 25% | 0.015 |
| Example 13 | PVA-21 | 150° C. | 0.8 MPa | 25% | 0.010 |
| Example 14 | PVA-24 | 150° C. | 1.8 Mpa | 25% | 0.011 |
| Example 15 | PVA-25 | 150° C. | 1.7 Mpa | 25% | 0.029 |
| Example 16 | PVA-29 | 60° C. | — | 55% | 0.010 |
| Comparative Example 10 | PVA-21 | 150° C. | 0.8 Mpa | 25% | 0.010 |
| Comparative Example 11 | PVA-26 | 150° C. | 0.8 Mpa | 25% | 0.005 |
| Comparative Example 12 | PVA-21 | 150° C. | 0.8 Mpa | 25% | 0.010 |
| Comparative Example 13 | PVA-21 | 150° C. | 0.8 Mpa | 25% | 0.010 |
| Comparative Example 14 | PVA-28 | 60° C. | — | 60% | 0.009 |

TABLE 6

| | PVA species | 1,2-Glycol content | Degree of poly-meri-zation | Degree of hydro-lysis | Short-chain branch content | Como-nomer content |
|---|---|---|---|---|---|---|
| Example 8 | PVA-21 | 2.5 mol % | 1200 | 95 mol % | 0.084 mol % | 0 mol % |
| Example 9 | PVA-22 | 2.2 mol % | 1700 | 95 mol % | 0.043 mol % | 0 mol % |
| Example 10 | PVA-23 | 2.9 mol % | 920 | 95 mol % | 0.124 mol % | 0 mol % |
| Example 11 | PVA-21 | 2.5 mol % | 1200 | 95 mol % | 0.084 mol % | 0 mol % |
| Example 12 | PVA-30 | 2.5 mol % | 1200 | 92 mol % | 0.084 mol % | 0 mol % |
| Example 13 | PVA-21 | 2.5 mol % | 1200 | 95 mol % | 0.084 mol % | 0 mol % |
| Example 14 | PVA-24 | 2.4 mol % | 1150 | 95 mol % | 0.083 mol % | 3 mol % |
| Example 15 | PVA-25 | 2.5 mol % | 1200 | 99 mol % | 0.082 mol % | 3 mol % |
| Example 16 | PVA-29 | 3.0 mol % | 1700 | 95 mol % | 0 mol % | 1.4 mol % |
| Comparative Example 10 | PVA-21 | 2.5 mol % | 1200 | 95 mol % | 0.084 mol % | 0 mol % |
| Comparative Example 11 | PVA-26 | 2.5 mol % | 1200 | 88 mol % | 0.084 mol % | 0 mol % |
| Comparative Example 12 | PVA-21 | 2.5 mol % | 1200 | 95 mol % | 0.084 mol % | 0 mol % |
| Comparative Example 13 | PVA-21 | 2.5 mol % | 1200 | 95 mol % | 0.084 mol % | 0 mol % |
| Comparative Example 14 | PVA-28 | 1.6 mol % | 1400 | 95 mol % | 0 mol % | 0 mol % |

TABLE 7

| | PVA species | Plasticizer (wt parts*) | Filler (wt parts*) | Starch (wt parts*) |
|---|---|---|---|---|
| Example 8 | PVA-21 | Trimethylolpropane (40) | Silica (10) | Oxidized cornstarch (20) |
| Example 9 | PVA-22 | Glycerol (40) | Silica (10) | Esterified potato starch (20) |
| Example 10 | PVA-23 | Dipropylene glycol (40) | Silica (10) | Oxidized cornstarch (20) |
| Example 11 | PVA-21 | Trimethylolpropane (40) | Silica (10) | — (0) |
| Example 12 | PVA-30 | Trimethylolpropane (30) | Silica (15) | Oxidized cornstarch (20) |
| Example 13 | PVA-21 | Trimethylolpropane (40) | Silica (20) | Oxidized cornstarch (10) |
| Example 14 | PVA-24 | Trimethylolpropane | Silica (10) | Oxidized |

TABLE 7-continued

|   | PVA species | Plasticizer (wt parts*) | Filler (wt parts*) | Starch (wt parts*) |
|---|---|---|---|---|
| Example 15 | PVA-25 | Trimethylolpropane (50) (30) | Silica (10) | cornstarch (20) Oxidized cornstarch (20) |
| Example 16 | PVA-29 | Trimethylolpropane (40) | Silica (10) | Oxidized cornstarch (20) |
| Comparative Example 10 | PVA-21 | — (0) | Silica (10) | Oxidized cornstarch (20) |
| Comparative Example 11 | PVA-26 | Trimethylolpropane (40) | Silica (10) | Oxidized cornstarch (20) |
| Comparative Example 12 | PVA-21 | — (0) | Silica (10) | — (0) |
| Comparative Example 13 | PVA-21 | — (0) | — (0) | — (0) |
| Comparative Example 14 | PVA-28 | Trimethylolpropane (40) | — (0) | — (0) |

*Per 100 weight parts of PVA.

TABLE 8

|   | PVA species | Water solubility (BT/DT) (sec) | Young's modulus (kg/mm²) |
|---|---|---|---|
| Example 8 | PVA-21 | 14/26 | 2.5 |
| Example 9 | PVA-22 | 18/37 | 2.6 |
| Example 10 | PVA-23 | 10/19 | 2.8 |
| Example 11 | PVA-21 | 15/28 | 3.4 |
| Example 12 | PVA-30 | 12/25 | 2.6 |
| Example 13 | PVA-21 | 13/25 | 3.0 |
| Example 14 | PVA-24 | 26/50 | 3.2 |
| Example 15 | PVA-25 | 20/42 | 2.7 |
| Example 16 | PVA-29 | 17/31 | 2.0 |
| Comparative Example 10 | PVA-21 | 60/120 | 5.5 |
| Comparative Example 11 | PVA-26 | 9/18 | 1.3 |
| Comparative Example 12 | PVA-21 | 30/65 | 3.5 |
| Comparative Example 13 | PVA-21 | 130/250 | 3.4 |
| Comparative Example 14 | PVA-28 | 65/125 | 2.2 |

*BT indicates the bag breakage time, and DT the complete dissolution time.

As is evident from the results of the above examples and comparative examples, the water-soluble resin compositions of the present invention and the water-soluble films produced using those water-soluble resin compositions are satisfactory in water solubility and show improvements in handling qualities such as film stiffness and strength, hence in processability. They are also superior in biodegradability and odorlessness. These improvements have been attained by incorporating a specific amount of a plasticizer and a specific amount of a monosaccharide and/or a polysaccharide, preferably together with a specific amount of an inorganic filler, in a PVA species having a specific 1,2-glycol linkage content and a specific degree of hydrolysis, or by incorporating a specific amount of a plasticizer and a specific amount of an inorganic filler in a PVA species having a specific 1,2-glycol linkage content and a specific degree of hydrolysis.

Utilizing the above characteristic features, the water-soluble films of the invention can be used in packaging various chemicals or agents such as dyes, detergents, agrochemicals or pesticides, toilet detergents, bath additives, disinfectants, weakly acidic substances, weakly alkaline substances and chlorine-containing substances, or like those water-soluble films which are known in the art, for example for use in printing on curved surfaces.

Although the present invention has been fully described in connection with the preferred embodiments thereof, those skilled in the art will readily conceive of numerous changes and modifications within the framework of obviousness upon the reading of the specification herein presented of the present invention. Accordingly, such changes and modifications are, unless they depart from the scope of the present invention as delivered from the claims annexed thereto, to be construed as included therein.

What is claimed is:

1. A water-soluble resin composition which comprises (i) 100 parts by weight of a polyvinyl alcohol polymer having a 1,2-glycol linkage content of at least 1.8 mole percent and a degree of hydrolysis of at least 90 mole percent, (ii) 1 to 50 parts by weight of a plasticizer and (iii) 5 to 50 parts by weight of a monosaccharide and/or a polysaccharide.

2. A water-soluble resin composition as claimed in claim 1, wherein the polysaccharide is starch.

3. A water-soluble resin composition as claimed in claim 1, wherein the polyvinyl alcohol polymer having a 1,2-glycol linkage content of at least 1.8 mole percent and a degree of hydrolysis of at least 90 mole percent has at least 0.03 mole percent of short-chain branches.

4. A water-soluble film produced by using the water-soluble resin composition of claim 1.

5. A water-soluble film as claimed in claim 4 which has a Young's modulus of at least 1.5 kg/mm².

6. A water-soluble film as claimed in claim 5 which requires a time not longer than 130 seconds for complete dissolution thereof in water at 20° C. (film thickness 40 μm).

7. A water-soluble resin composition which comprises (i) 100 parts by weight of a polyvinyl alcohol polymer having a 1,2-glycol linkage content of at least 1.8 mole percent and a degree of hydrolysis of at least 90 mole percent, (ii) 1 to 50 parts by weight of a plasticizer, (iii) 5 to 50 parts by weight of a monosaccharide and/or a polysaccharide and (iv) 1 to 20 parts by weight of an inorganic filler.

8. A water-soluble resin composition as claimed in claim 7, wherein the polysaccharide is starch.

9. A water-soluble resin composition as claimed in claim 7, wherein the polyvinyl alcohol polymer having a 1,2-glycol linkage content of at least 1.8 mole percent and a degree of hydrolysis of at least 90 mole percent has at least 0.03 mole percent of short-chain branches.

10. A water-soluble film produced by using the water-soluble resin composition of claim 7.

11. A water-soluble film as claimed in claim 10 which has a Young's modulus of at least 1.5 kg/mm².

12. A water-soluble film as claimed in claim 10 which requires a time not longer than 130 seconds for complete dissolution thereof in water at 20° C. (film thickness 40 μm).

13. A water-soluble resin composition which comprises (i') 100 parts by weight of a polyvinyl alcohol polymer having a 1,2-glycol linkage content of at least 1.8 mole percent and a degree of hydrolysis of 92 to 99 mole percent, (ii') 1 to 50 parts by weight of a plasticizer and (iv') 1 to 20 parts by weight of an inorganic filler.

14. A water-soluble film produced by using the water-soluble resin composition of claim 13.

15. A water-soluble film as claimed in claim 14 which has a Young's modulus of at least 1.5 kg/mm².

16. A water-soluble film as claimed in claim 15 which requires a time not longer than 50 seconds for complete dissolution thereof in water at 20° C. (film thickness 40 μm).

17. A water-soluble resin composition as claimed in claim 13 which further comprises 5 to 50 parts by weight of a monosaccharide and/or a polysaccharide based on 100 parts by weight of the polyvinyl alcohol polymer having a 1,2-glycol linkage content of at least 1.8 mole percent and a degree of hydrolysis of 92 to 99 mole percent.

18. A water-soluble resin composition as claimed in claim 17, wherein the polysaccharide is starch.

19. A water-soluble film produced by using the water-soluble resin composition of claim 17.

* * * * *